United States Patent
Krishnan et al.

(10) Patent No.: US 10,382,353 B1
(45) Date of Patent: Aug. 13, 2019

(54) ENHANCING INCOMPLETE CLOUD TEMPLATES FOR INFRASTRUCTURE DEPLOYMENT

(71) Applicant: Amazon Technologies, Inc., Seattle, WA (US)

(72) Inventors: Karthikeyan Krishnan, Sammamish, WA (US); David Ricardo Rocamora, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 15/378,396

(22) Filed: Dec. 14, 2016

(51) Int. Cl.
*G06F 17/24* (2006.01)
*H04L 12/24* (2006.01)
*H04L 29/08* (2006.01)
*G06F 3/0484* (2013.01)
*H04L 12/911* (2013.01)

(52) U.S. Cl.
CPC .......... *H04L 47/70* (2013.01); *G06F 3/04847* (2013.01); *G06F 17/248* (2013.01); *H04L 41/0823* (2013.01); *H04L 67/10* (2013.01); *H04L 67/306* (2013.01)

(58) Field of Classification Search
CPC ..... H04L 47/70; H04L 41/0823; H04L 67/10; H04L 67/306; G06F 3/04847
See application file for complete search history.

(56) References Cited

U.S. PATENT DOCUMENTS

2017/0237679 A1* 8/2017 Kumar ................. G06F 9/5072
709/226
2018/0101371 A1* 4/2018 Flanakin ................... G06F 8/36

OTHER PUBLICATIONS

Amazon webservices, AWS CloudFormation,User Guide, API Version May 15, 2010, http://docs.aws.amazon.com/AWSCloudFormation/latest/UserGuide/cfn-ug.pdf, 1828 pages.

* cited by examiner

*Primary Examiner* — El Hadji M Sall
(74) *Attorney, Agent, or Firm* — Lowenstein Sandler LLP (57) ABSTRACT

A method of enhancing an incomplete cloud infrastructure template may include receiving a template defining a cloud infrastructure stack associated with a customer account, wherein the template comprises at least one resource definition specifying a first cloud infrastructure resource. The method may further include performing a dependency check of the template. The method may further include identifying, in the resource definition, an unresolved reference to a second cloud infrastructure resource. The method may further include resolving the reference by producing, based on a plurality of templates associated with the customer account, a definition of the second cloud infrastructure resource. The method may further include modifying the template to include the definition of the second cloud infrastructure resource and causing the cloud infrastructure stack to be provisioned based on the template.

19 Claims, 7 Drawing Sheets

Fig. 1

```
"Resources" : {
    "MyInstance" : {
        "Type" : "AWS::EC2::Instance",
        "Properties" : {
            "UserData" : {
                "Fn::Base64" : {
                    "Fn::Join" : [ "", [ "Queue=", { "Ref" : "MyQueue" } ] ]
                }
            },
            "AvailabilityZone" : "us-east-1a",
            "ImageId" : "ami-20b65349"
        }
    },
    "MyQueue" : {
        "Type" : "AWS::SQS::Queue",
        "Properties" : {
        }
    }
}
```

Fig. 2

| Primary Resource Type 320 | Resource Property ID 330 | Dependent resource type 340 |
|---|---|---|
| | | |
| | | |
| | | |
| | | |

Look-up table 300

Rows 310

ENHANCING INCOMPLETE CLOUD TEMPLATES FOR INFRASTRUCTURE DEPLOYMENT

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity, and measured service. The cloud computing model includes several service models, including Software as a Service (SaaS), Platform as a Service (PaaS), and Infrastructure as a Service (IaaS). The cloud computing model may be implemented according to one of the several deployment models, including private cloud, community cloud, public cloud, and hybrid cloud.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding only.

DETAILED DESCRIPTION

Described herein are systems and methods for enhancing incomplete cloud templates for infrastructure deployment. In accordance with one or more aspects of the present disclosure, a cloud infrastructure template may be analyzed by the cloud management service to identify unresolved references (undefined cloud infrastructure resources, undefined template parameters or missing required properties). The cloud management service may then analyze the template, the customer's account, common template libraries or other information sources to supply the missing resource, parameter, or property definitions, as described in more detail herein below.

Cloud infrastructure is a collection of hardware and software that implements the cloud computing model. At the physical layer, cloud infrastructure may include hardware resources employed to support the cloud services being provided, such as compute, network, and storage servers. At the abstraction layer, cloud infrastructure may include various software modules deployed across the physical layer for delivering the cloud functionality to the user.

"Cloud infrastructure stack" (or "stack") herein shall refer to a collection of cloud resources associated with a certain customer's account. Viewed from the user's perspective, a cloud infrastructure stack may include compute instances, storage instances, database instances, messaging instances, logical networks, load balancers, and various other resources.

A cloud infrastructure stack may be described by a template. Represented by a text in a certain formal language (such as JSON or YAML), such a template may include definitions of resources, their inter-dependencies, and their properties. A cloud management service may provide one or more interfaces including, e.g., a graphical user interface (GUI), a command-line interface (CLI), or an application programming interface (API) for template creation and modification. The cloud management service may parse a template and cause the hardware and software resources be provisioned and configured for implementing the cloud infrastructure stack specified by the template.

In certain implementations, the cloud management service may, before executing provisioning and configuration service calls, perform dependency check on the template. Should the template contain at least one unresolved resource or parameter reference or at least one undefined resource property, the dependency check may fail, thus aborting the stack creation. Therefore, the templates that are processed by the cloud management service are expected to fully define every aspect of the cloud infrastructure stack. The process of specifying the resources and their properties may be time consuming and prone to errors.

Systems and methods of the present disclosure improve the reliability and efficiency of the cloud management service, by relaxing dependency requirements to templates specifying cloud infrastructures. An incomplete template may include one or more unresolved references to cloud infrastructure resources or template parameters. "Unresolved" reference herein shall refer to a reference that specifies a resource or a parameter which is not defined by the template. An incomplete template may also include one or more resource definitions in which at least one of the required resource parameters is not defined.

In accordance with one or more aspects of the present disclosure, an add-on component for the cloud management service may be created for pre-processing incomplete templates (e.g., as part of the template creation workflow or just-in-time before the template execution) in order to resolve the references by supplying the missing resource or parameter definitions and specifying the required resource properties.

In an illustrative example, the add-on component may apply one or more production rules to a template being processed. Each production rule may define a condition (also referred to as the left-hand side of the rule) and an action to be performed on the template (also referred to as the right-hand side of the rule) upon successfully evaluating the condition. The left-hand part of the rule may include a pattern to be matched to at least part of the template, and the right-hand part may specify a resource or parameter definition which is missing from the original template, as described in more detail herein below.

In another illustrative example, the add-on component may execute one or more statistical models that are designed to yield values of infrastructure resource properties. Such statistical models may be produced by various machine learning methods that involve processing one or more training data sets (e.g., templates describing existing stacks associated with the same customer account as the incomplete template or libraries of common template patterns associated with a certain industry segment) in order to determine one or more parameters of the statistical model, as described in more detail herein below.

In an illustrative example, the add-on component may produce multiple mutually-exclusive candidate definitions for a certain infrastructure resource. The add-on component may then evaluate a quality metric for each of the candidate definitions, and select the candidate definition having the optimal (e.g., minimal or maximal) value of the quality metric. Alternatively, the add-on component may use the multiple candidate resource definitions for producing corresponding candidate templates. The add-on component may then evaluate a quality metric for each of the candidate templates, and select the candidate template having the optimal value of the quality metric.

In another illustrative example, the add-on component may produce multiple mutually-exclusive candidate values for a certain resource property. The add-on component may then use the multiple candidate values for producing corresponding candidate resource definitions. The add-on component may then evaluate a quality metric for each of the candidate resource definitions, and select the candidate resource definition having the optimal value of the quality metric. Alternatively, the add-on component may use the candidate resource definitions to produce corresponding candidate templates. The add-on component may then evaluate a quality metric for each of the candidate templates, and select the candidate template having the optimal value of the quality metric.

In yet another illustrative example, the add-on component may produce multiple mutually-exclusive candidate parameter values for a certain template parameter. The add-on component may then use the multiple candidate parameter values for producing corresponding candidate templates. The add-on component may then evaluate a quality metric for each of the candidate templates, and select the candidate template having the optimal value of the quality metric.

The quality metric may reflect various features of the candidate infrastructure resource or the candidate template. In an illustrative example, a quality metric may be represented by a weighted sum of multiple quality metric components, each component reflecting certain operational, architectural, or other aspects of the infrastructure resource or the template being evaluated. The quality metric may also reflect the operational cost of the infrastructure resource or the whole stack.

In certain implementations, the cloud management service may, before executing the template, invoke a template verification GUI to display the template and accept the user input confirming or rejecting the template or selecting one of several candidate templates. The template verification GUI may also display several candidate resource definitions or property values and accept user's input selecting one of them for executing the template.

Thus, the systems and methods described herein represent improvements over various common resource provisioning methods, by providing systems and methods for provisioning cloud infrastructure based on incomplete template definitions. The systems and methods described herein may be implemented by hardware (e.g., general purpose or specialized processing devices, or other devices and associated circuitry), software (e.g., instructions executable by a processing device), or a combination thereof. Various aspects of the above referenced methods and systems are described in details herein below by way of example, rather than by way of limitation.

Figure 1:
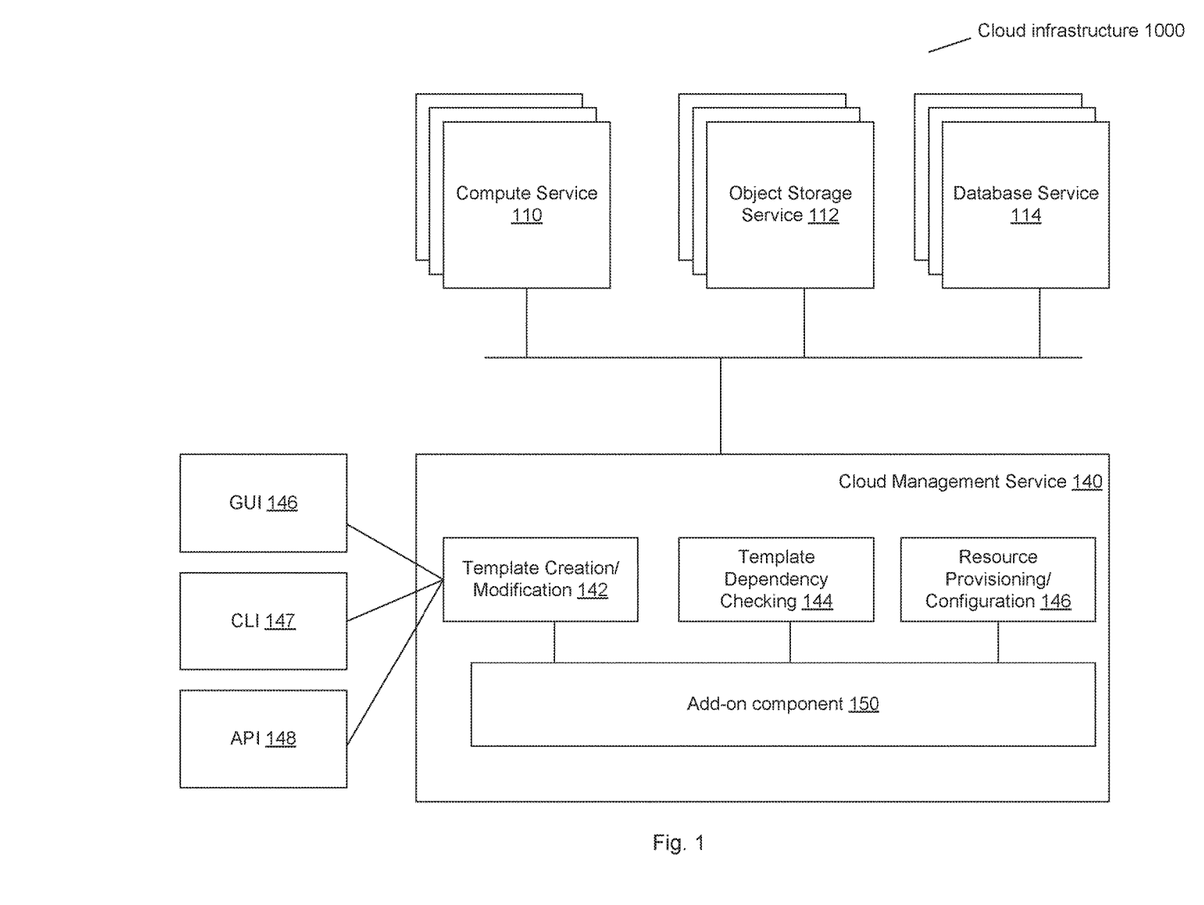
FIG. 1 schematically illustrates an example cloud infrastructure in which systems and methods described herein may operate.

FIG. 1 schematically illustrates an example cloud infrastructure 1000 in which systems and methods described herein may operate. The cloud infrastructure 1000 may include a compute service 110, an object storage service 112, a database service 114, as well as various other services that are omitted from FIG. 1 for clarity and conciseness. While FIG. 1 illustrates each of the above listed services running on a dedicated hardware server, in certain implementations, two or more services may be collocated on a single hardware server. Servers executing the above listed services may be interconnected by one or more networks 130, including one or more local area networks, one or more wide area networks, or any combination thereof.

In various illustrative examples, the compute service may provide scalable computing capacity, e.g., in the form of virtual machine instances or containers. The object storage service 112 may implement a scalable object storage system with a web service interface. The database service may implement a relational database supporting structured query language (SQL) interface. These and other services may have configurable high-availability, auto-scaling and other operational features.

The above-referenced and other services may be managed by the cloud management service 140 which, among other functions, may perform resource provisioning and configuration. Thus, among other functional components, the cloud management service 140 may include a template creation and modification component 142, a template dependency checking component 144, and a resource provisioning and configuration component 146.

The template creation and modification component 142 may be equipped with a GUI 146, a CLI 147, and an API 148. In an illustrative example, the template creation and modification component 142 may employ the GUI 146 to visually represent the stack resources, accept user input specifying the resources and their properties, and output a template 144 that describes, by a text in a certain formal language (such as JSON or YAML), a cloud infrastructure stack to be provisioned and configured.

Figure 2:
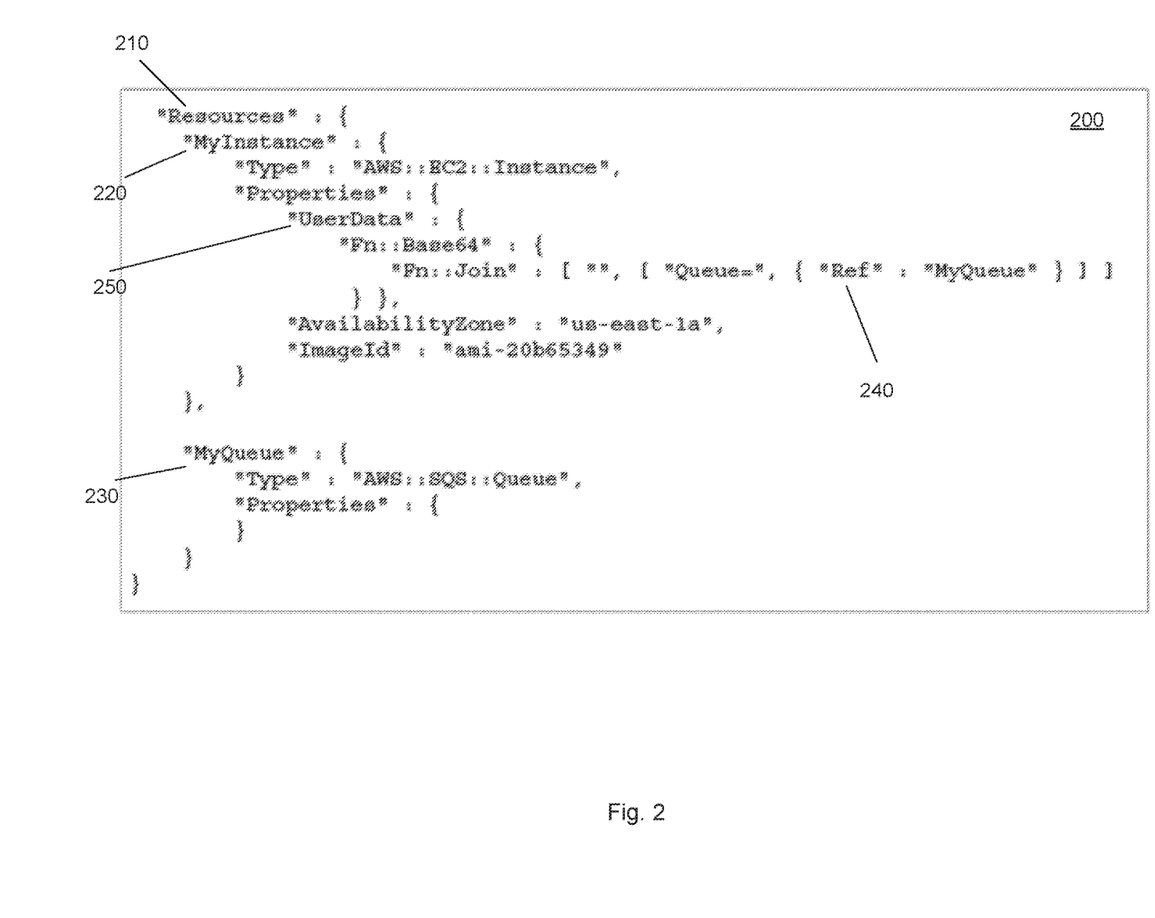
FIG. 2 schematically illustrates an example template fragment that may be processed by systems and methods operating in accordance with one or more aspects of the present disclosure.

A template may include several sections, including a required Resource section which specifies the stack resources and their properties and an optional Parameters section that specifies the values to be passed to the template at runtime (i.e., when the stack is created or updated). FIG. 2 schematically illustrates an example template fragment 200 that may be processed by systems and methods operating in accordance with one or more aspects of the present disclosure.

As schematically illustrated by FIG. 2, the template fragment 200 includes the Resources section 210 that defines two resources: MyInstance 220 and MyQueue 230. Each resource declaration may begin with an alphanumeric string specifying the resource logical name which may be used to refer to the resource within the template. Depending on the resource type, the resource definition may include one or more property values. Certain properties may be optional in order to add certain functionality to the resource. Certain properties may have default values, so specifying values for those properties may be optional. A resource type may specify certain properties as being required, so that the template is expected to include values of such properties in order to pass the dependency check performed by the dependency checking component 144.

In the illustrative example of FIG. 2, MyInstance resource references, using "Ref" function call 240, the MyQueue resource as the value of UserData property 250. Assuming that UserData property is required for the specified resource type of MyInstance resource, the dependency checking component 144 may fail the dependency check upon discovering that the property is missing from the template.

However, as noted herein above, systems and methods of the present disclosure allow relaxing dependency requirements to templates specifying cloud infrastructures, by processing incomplete templates that may include unresolved references or missing property definitions. Referring again to FIG. 1, an add-on component 150 for the cloud management service 140 operating in accordance with one or more aspects of the present disclosure may perform pre-processing of incomplete templates in order to resolve the references by supplying the missing resource or parameter definitions and defining the required resource properties. In various illustrative examples, the add-on component 150 may be implemented by processing logic that includes hardware (e.g., circuitry, dedicated logic, programmable logic, microcode, etc.), software (e.g., instructions run on a processor to perform hardware simulation), or a combination thereof In an illustrative example, the add-on component 150 may be invoked by the template creation and modification component 144 as part of the template creation workflow. Alternatively, template pre-processing may be performed just-in-time by invoking the add-on component 150 before the template execution.

In certain implementations, the add-on component 150 may process the template by applying one or more production rules. Each production rule may define a condition (also referred to as the left-hand side of the rule) and an action to be performed on the template (also referred to as the right-hand side of the rule) upon successfully evaluating the condition. The left-hand part of the rule may include a pattern to be matched to at least part of the template, and the right-hand part may specify a resource or parameter definition which is missing from the original template, as described in more detail herein below. In an illustrative example, the condition specified by left-hand side of the rule may, for a certain resource type (e.g., AWS::RCE::Instance), attempt to resolve a reference specified by one of the properties (e.g, UserData). Should the condition be evaluated to false (indicating an unresolved reference specified by the UserData property), the right-hand side of the rule may be invoked, specifying an action of inserting, into the template, a definition of a resource of a certain type (e.g., "AWS::SQS::Queue") and modifying the property containing the unresolved reference (e.g., UserData) to reference the newly created resource definition. The type of resource specified by the newly created resource definition may be determined by a look-up table that maps properties of a certain resource type (e.g., AWS::RCE::Instance) to their respective dependent resource types.

Figure 3:
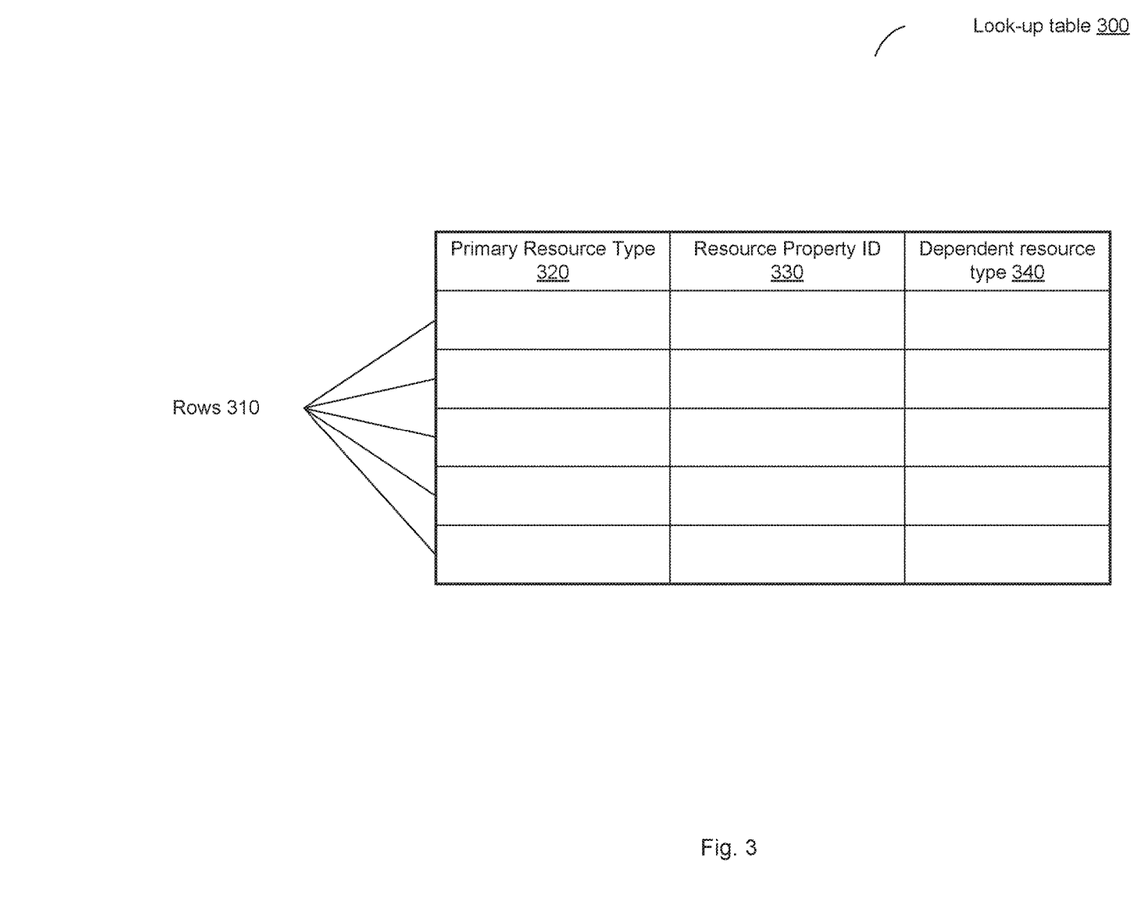
FIG. 3 schematically illustrates the structure of an example look-up table defining dependent resource types, in accordance with one or more aspects of the present disclosure.

FIG. 3 schematically illustrates the structure of an example look-up table defining dependent resource types, in accordance with one or more aspects of the present disclosure. As schematically illustrated by FIG. 3, the look-up table 300 may include multiple rows, each row 310 mapping the combination of the primary resource type 320 and its property 330 to the corresponding dependent resource type 340.

In an illustrative example, the action defined by the right-hand side of the rule may involve comparing the instant template to other templates associated with the same customer account in order to determine values of certain properties. In an illustrative example, the action may specify setting certain properties for the newly created resource to the same values as those specified by other templates associated with the same customer account.

In another illustrative example, the action defined by the right-hand side of the rule may involve comparing the instant template to common template patterns associated with a certain industry segment in order to determine values of certain properties. In an illustrative example, the action may specify setting certain properties for the newly created resource to the same values as those specified by the common template patterns of a template library associated with the given industry segment.

In certain implementations, processing the template by the add-on component 150 may involve invoking a statistical model that is designed to yield a value of a certain resource property. In an illustrative example, the statistical model may include several classifiers, each of which yields a degree of association of at least a subset of the stack defined by the template with a specified category, e.g., availability category, service level category, etc. Each classifier may be represented by a function that defines one or more dividing hyper-planes in the hyper-space the coordinates of which correspond to certain features (e.g., parameter values, property values, and resource types) of the template being processed. Various known methods, such as naïve Bayes classifier or support vector machines, may be employed for constructing the classifiers that are employed by the add-on component 150. Upon evaluating the classifiers, the add-on component may select the category that corresponds to the classifier that has yielded the maximal degree of association value. The add-on component may then invoke a set of rules corresponding to the selected category in order to specify the values of certain template parameters and properties.

In certain implementations, processing the template by the add-on component 150 may involve invoking a decision tree. Each internal node of the decision tree may represent a condition specified on one or more template attributes (e.g., ascertaining the presence of certain resource type or a certain parameter value). Each branch of the decision tree represents the outcome of evaluating the condition, and each terminal node references an action to be performed on the template. In an illustrative example, the decision path may include a condition that, for a certain resource type (e.g., AWS::RCE::Instance), attempts to resolve a reference specified by one of the properties (e.g, UserData). The terminal node associated with the condition being evaluated to false (indicating an unresolved reference specified by the UserData property) may specify an action of inserting, into the template, a definition of a resource of a certain type (e.g., "AWS::SQS::Queue") and modifying the property containing the unresolved reference (e.g., UserData) to reference the newly created resource definition. The type of resource specified by the newly created resource definition may be determined by a look-up table that maps properties of a certain resource type (e.g., AWS::RCE::Instance) to their respective dependent resource types, e.g., a look-up table 300 of FIG. 3.

In an illustrative example, the action defined by the decision tree may involve comparing the instant template to other templates associated with the same customer account in order to determine values of certain properties. In an illustrative example, the action may specify setting certain properties for the newly created resource to the same values as those specified by other templates associated with the same customer account.

In another illustrative example, the action defined by the decision tree may involve comparing the instant template to common template patterns associated with a certain industry segment in order to determine values of certain properties. In an illustrative example, the action may specify setting certain properties for the newly created resource to the same values as those specified by the common template patterns of a template library associated with the given industry segment.

In certain implementations, parameters of the rules, statistical models, decision trees or other procedures invoked by the add-on component 150 may be determined by machine learning methods. In an illustrative example, a classification function employed by the add-on component 150 may be provided by a naïve Bayes classifier:

$$p(C_k \mid F_1, \ldots, F_n) = \frac{1}{Z} p(C_k) \prod_{i=1}^{n} p(F_i \mid C_k)$$

where $p(c_k|F_1, \ldots, F_n)$ is classifier output representing the degree of association of an object having the parameter values $F_1, \ldots, F_n$ being associated with the category $C_k$ (e.g., degree of association of the template being processed with a certain high-availability category), $P(c_k)$ is the apriori probability of an object being associated with the category $C_k$ (e.g., the ratio of number of stacks associated with the given high-availability category to the total number of stacks associated with the customer's account), and $P(F_i|C_k)$ is the conditional probability of an object having the parameter value $F_i$ being associated with the category $C_k$ (e.g., the ratio of number of stacks that are associated with the given high-availability category and include a certain resource type to the total number of stacks associated with the customer's account).

Thus, the values of $P(c_k)$ and $P(F_i|C_k)$ may be calculated based on one or more training data sets that may include the templates describing existing stacks associated with the same customer account as the incomplete template and libraries of common template patterns associated with a certain industry segment.

In certain implementations, the add-on component 150 may produce multiple mutually-exclusive candidate definitions for a certain infrastructure resource (e.g., by employing multiple decision trees evaluating different sets of stack parameters and thus producing different results). The add-on component 150 may then evaluate a certain quality metric for each of the candidate definitions, as described in more detail herein below. The add-on component 150 may select, for updating the template being processed, the candidate resource definition having the optimal value of the quality metric and discard other candidate resource definitions.

Alternatively, the add-on component 150 may use the multiple candidate resource definitions for producing corresponding candidate templates, such that each candidate template would include one of the mutually-exclusive candidate resource definitions. The add-on component 150 may then evaluate a quality metric for each of the candidate templates and select the candidate template having the optimal value of the quality metric and discard other candidate templates.

In certain implementations, the add-on component 150 may produce multiple mutually-exclusive candidate values for a certain resource property (e.g., by employing multiple statistical models operating on different sets of stack parameters and thus producing different results). The add-on component may then use the multiple candidate values for producing corresponding candidate resource definitions, such that each candidate resource definition would include one of the mutually-exclusive candidate values. The add-on component 150 may then evaluate a quality metric for each of the candidate resource definitions, as described in more detail herein below. The add-on component 150 may select, for updating the template being processed, the candidate resource definition having the optimal value of the quality metric and discard other candidate resource definitions.

Alternatively, the add-on component 150 may use the multiple candidate resource definitions for producing corresponding candidate templates, such that each candidate template would include one of the mutually-exclusive candidate resource definitions. The add-on component 150 may then evaluate a quality metric for each of the candidate templates and select the candidate template having the optimal value of the quality metric and discard other candidate templates.

In certain implementations, the add-on component 150 may produce multiple mutually-exclusive candidate parameter values for a certain template parameter. The add-on component 150 may then use the multiple candidate parameter values for producing corresponding candidate templates, such that each candidate resource definition would include one of the mutually-exclusive candidate values. The add-on component 150 may then evaluate a quality metric for each of the candidate templates and select the candidate template having the optimal value of the quality metric and discard other candidate templates.

The quality metric may reflect various features of the candidate infrastructure resource or the candidate template. In an illustrative example, a quality metric may be represented by a weighted sum of multiple quality metric components, each component reflecting certain operational, architectural, or other aspects of the infrastructure resource or the template being evaluated:

$$Q(a) = \Sigma w_i * S(a_i),$$

where Q is the quality metric value, a is a vector of attributes reflecting operational, architectural, or other aspects of the infrastructure resource or the template being evaluated, $w_i$ is the weight coefficient of the i-th component of the quality metric, and $S(a_i)$ is a scoring function translating an attribute value to a quality score.

Thus, a template having certain architectural features (e.g., high availability instances, load balancing schemes, and auto-scaling features) may have the quality metric value higher than a similar template that lacks such features.

The quality metric may also reflect the operational cost of the infrastructure resource or the whole stack:

$$Q(a)=\Sigma w_i * C_i,$$

where Q is the quality metric value, $w_i$ is the weight coefficient of the i-th component of the quality metric, and $C_i$ is a value reflecting the operational cost of i-th component of the stack or resource.

In certain implementations, the cloud management service 140 may, before executing the template, invoke a template verification GUI to display the template and accept the user input confirming or rejecting the template. Alternatively, the template verification GUI may accept the user input selecting one of several candidate templates. In an illustrative example, the verification GUI may highlight or otherwise visually differentiate the cloud infrastructure resources, their properties and template parameters that have been determined by the add-on component.

The template verification GUI may further display several candidate resource definitions and accept user's input selecting one of them for executing the template. The template verification GUI may also display several candidate property values for a certain infrastructure resource and accept user's input selecting one of them for executing the template.

Example methods that may be performed by the cloud management service 140 and add-on component 150 for enhancing incomplete templates are described herein below with references to FIGS. 4-6.

Figure 4:
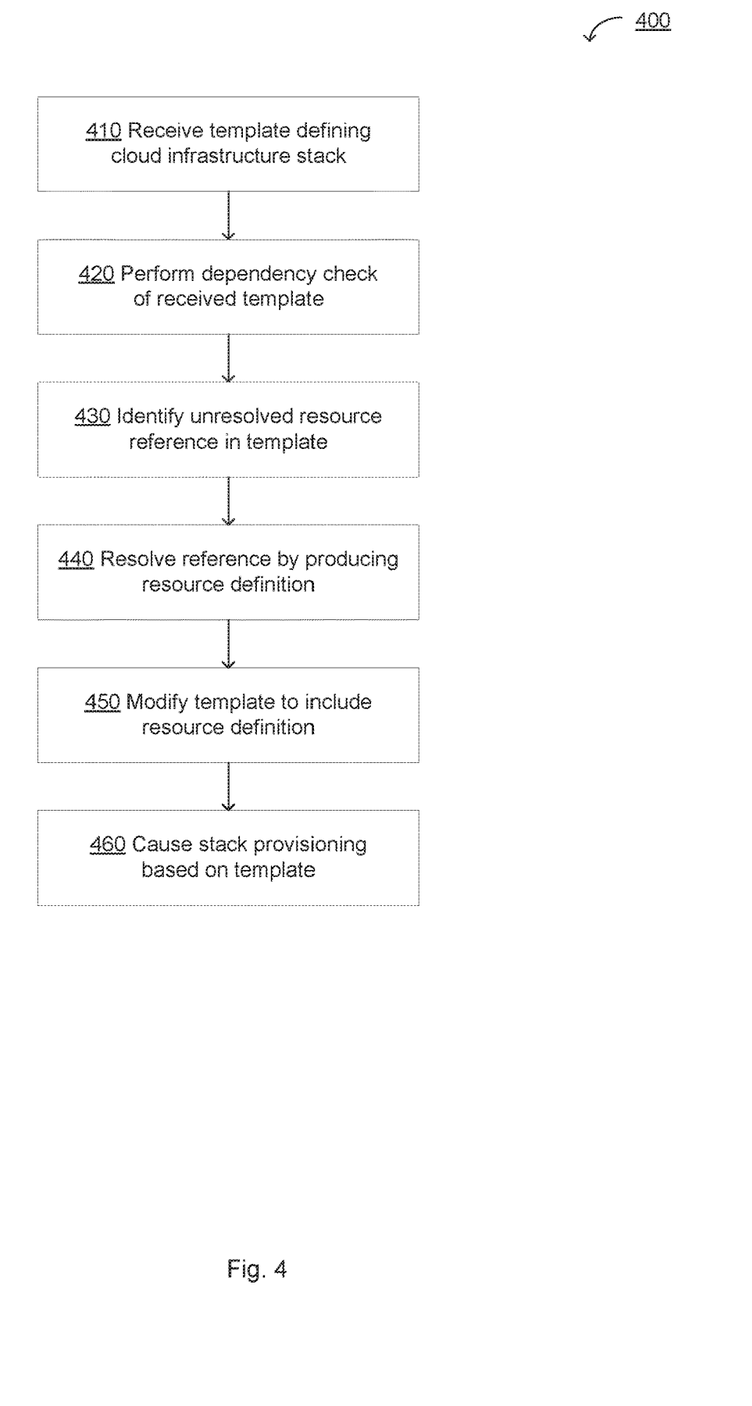
FIG. 4 is a flow diagram of an illustrative example of a method of resolving a resource reference in an incomplete template, in accordance with one or more aspects of the present disclosure.

In particular, FIG. 4 is a flow diagram of an illustrative example of a method of resolving a resource reference in an incomplete template, in accordance with one or more aspects of the present disclosure. The method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computing device 700 of FIG. 7) implementing the method. In certain implementations, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Referring to FIG. 4, at block 410, the processing device implementing the method may receive a template defining a cloud infrastructure stack. As noted herein above, the cloud management service may provide a GUI, a CLI and an API for receiving the template.

At block 420, the processing device may perform a dependency check of the received template. The dependency check may ascertain that the template does not contain any unresolved resource references. In an illustrative example, to perform the dependency check, the processing device may parse the template and attempt to resolve all references, i.e., to locate definitions of all resources that are referenced by the template.

At block 430, the processing device may identify, in the template, an unresolved resource reference to a cloud infrastructure resource, i.e., a reference that specifies a resource that is not defined by the template.

At block 440, the processing device may resolve the reference by producing a definition of the cloud infrastructure resource. As explained herein above, the processing device may invoke rules, statistical models, decision trees or other methods that analyze the template or various additional information sources (such as common template libraries or other templates associated with the same customer account) for producing one or more candidate resource definitions. In an illustrative example, the processing device may apply, to the template, a production rule defining an action to be performed on the template responsive to successfully evaluating a condition specified by the rule. In another illustrative example, the processing device may use a statistical model to yield a value of a property of the infrastructure resource. In certain implementations, various parameters of the rules, statistical models, decision trees or other procedures invoked by the processing device may be determined by machine learning methods, as described in more detail herein above.

At block 450, the processing device may modify the template to include the newly created definition of the cloud infrastructure resource. As explained herein above, the processing device may select, among multiple candidate resource definitions, the resource definition that has the optimal quality metric value and has been confirmed by the user via the template verification GUI. Alternatively, the processing device may select, among multiple candidate resource definitions, the resource definition that produces a template having the optimal quality metric value and has been confirmed by the user via the template verification GUI.

At block 460, the processing device may cause the cloud infrastructure stack to be provisioned based on the template, and the method may terminate.

Figure 5:
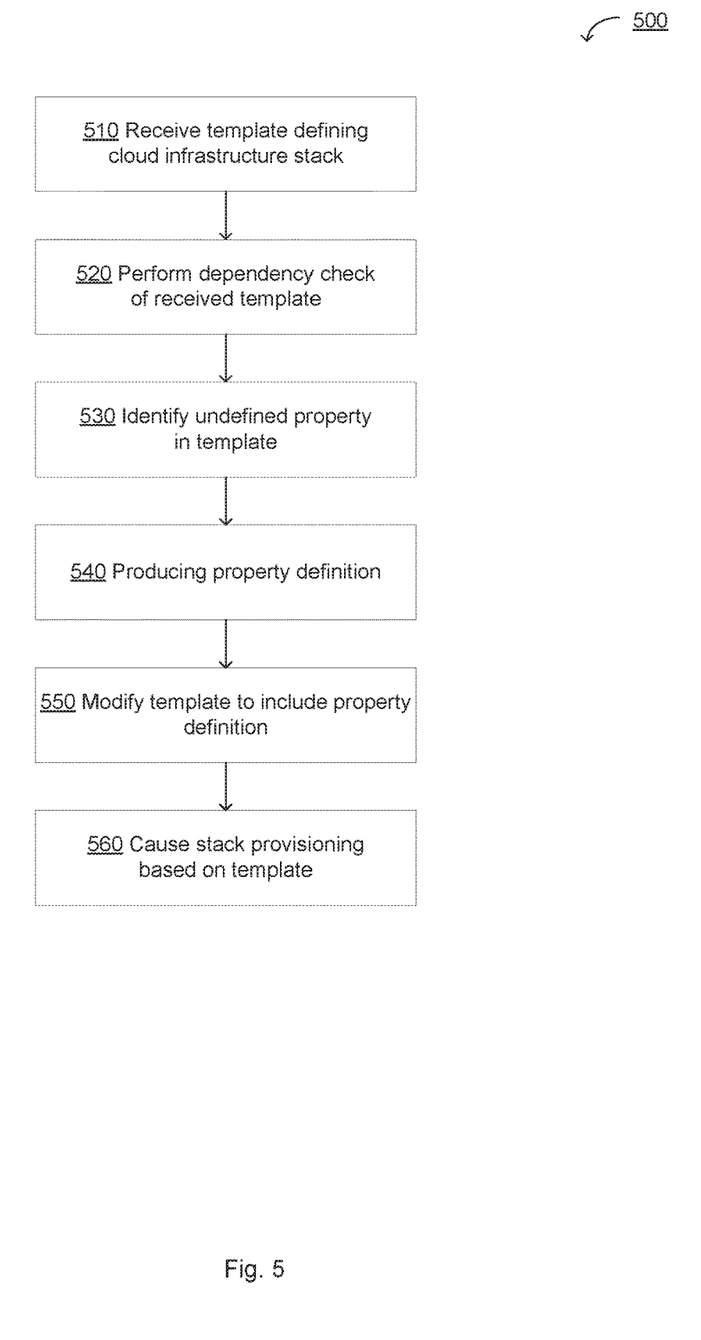
FIG. 5 is a flow diagram of an illustrative example of a method of defining a resource property in an incomplete template, in accordance with one or more aspects of the present disclosure.

FIG. 5 is a flow diagram of an illustrative example of a method of defining a resource property in an incomplete template, in accordance with one or more aspects of the present disclosure. The method 500 may be performed by processing logic that includes hardware (e.g., circuitry, dedicated logic, programmable logic, microcode, etc.), software (e.g., instructions run on a processor to perform hardware simulation), or a combination thereof. Method 500 or each of its individual functions, routines, subroutines, or operations may be performed by one or more processors of a computer system (e.g., the computing device 700 of FIG. 7) implementing the method. In certain implementations, method 500 may be performed by a single processing thread. Alternatively, method 500 may be performed by two or more processing threads, each thread implementing one or more individual functions, routines, subroutines, or operations of the method. In an illustrative example, the processing threads implementing method 500 may be synchronized (e.g., using semaphores, critical sections, or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel or in arbitrary selected orders.

Referring to FIG. 5, at block 510, the processing device implementing the method may receive a template defining a cloud infrastructure stack. As noted herein above, the cloud management service may provide a GUI, a CLI and an API for receiving the template.

At block 520, the processing device may perform a dependency check of the received template. The dependency check may ascertain that the template contains definitions of all required properties of all resources that are defined by the template. In an illustrative example, to perform the dependency check, the processing device may parse the template and ascertain, for every resource defined by the template, that the resource definition specifies all required properties.

At block 530, the processing device may identify, in the template, a resource definition that fails to specify a value of a required property.

At block 540, the processing device may produce the missing definition of the resource property. As explained herein above, the processing device may invoke rules, statistical models, decision trees or other methods that analyze the template or various additional information sources (such as common template libraries or other templates associated with the same customer account) for producing one or more candidate property definitions. In an illustrative example, the processing device may apply, to the template, a production rule defining an action to be performed on the template responsive to successfully evaluating a condition specified by the rule. In another illustrative example, the processing device may use a statistical model to yield a value of a property of the infrastructure resource. In certain implementations, various parameters of the rules, statistical models, decision trees or other procedures invoked by the processing device may be determined by machine learning methods, as described in more detail herein above.

At block 550, the processing device may modify the template to include the newly created definition of the property. As explained herein above, the processing device may select, among multiple candidate property definitions, the property definition that produces a template having the optimal quality metric value and has been confirmed by the user via the template verification GUI.

At block 560, the processing device may cause the cloud infrastructure stack to be provisioned based on the template, and the method may terminate.

Figure 6:
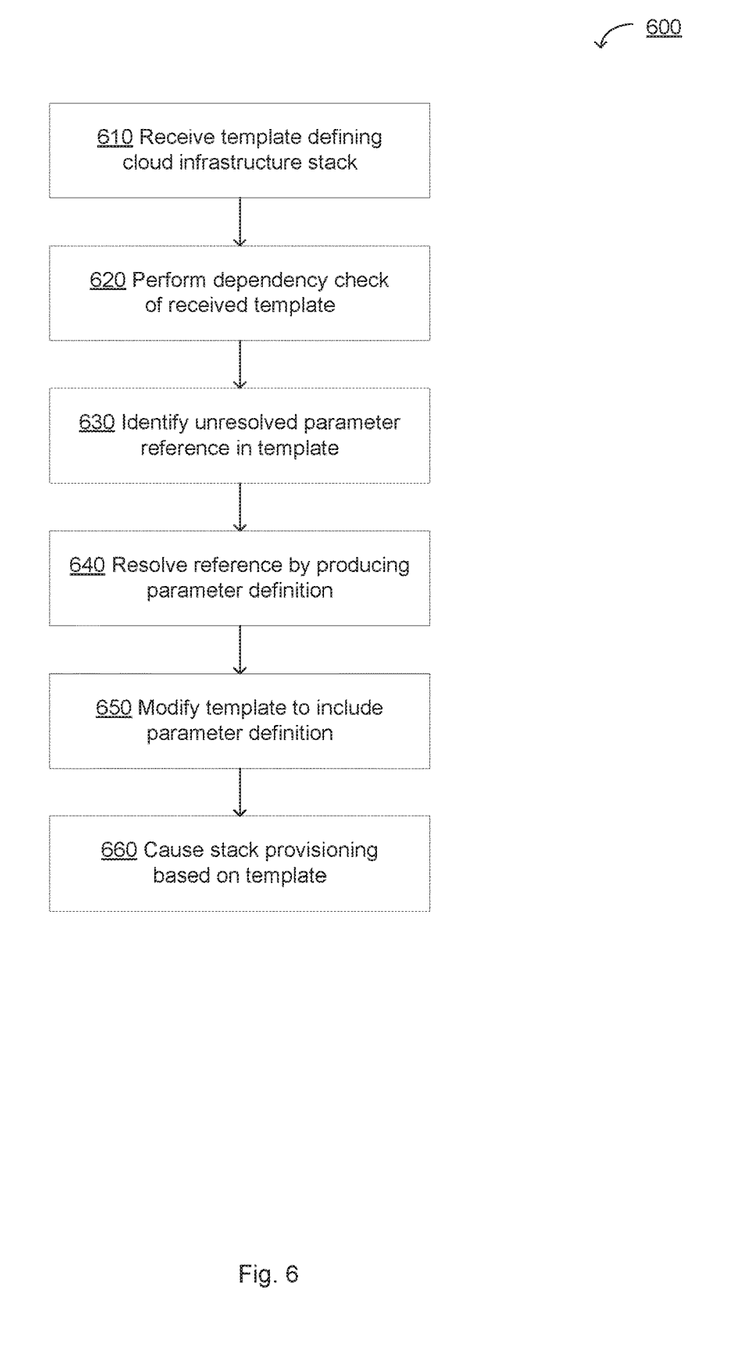
FIG. 6 is a flow diagram of an illustrative example of a method of defining a resource property in an incomplete template, in accordance with one or more aspects of the present disclosure

FIG. 6 is a flow diagram of an illustrative example of a method of defining a resource property in an incomplete template, in accordance with one or more aspects of the present disclosure. The method 600 may be performed by processing logic that includes hardware (e.g., circuitry, dedicated logic, programmable logic, microcode, etc.), software (e.g., instructions run on a processor to perform hardware simulation), or a combination thereof. Method 600 or each of its individual functions, routines, subroutines, or operations may be performed by one or more processors of a computer system (e.g., the computing device 700 of FIG. 7) implementing the method. In certain implementations, method 600 may be performed by a single processing thread. Alternatively, method 600 may be performed by two or more processing threads, each thread implementing one or more individual functions, routines, subroutines, or operations of the method. In an illustrative example, the processing threads implementing method 600 may be synchronized (e.g., using semaphores, critical sections, or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel or in arbitrary selected orders.

Referring to FIG. 6, at block 610, the processing device implementing the method may receive a template defining a cloud infrastructure stack. As noted herein above, the cloud management service may provide a GUI, a CLI and an API for receiving the template.

At block 620, the processing device may perform a dependency check of the received template. The dependency check may ascertain that the template does not contain any unresolved parameter references. In an illustrative example, to perform the dependency check, the processing device may parse the template and attempt to resolve all references to template parameters, i.e., to locate definitions of all parameters that are referenced by the template.

At block 630, the processing device may identify, in the template, an unresolved parameter reference to a cloud infrastructure resource, i.e., a reference that specifies a parameter that is not defined by the template.

At block 640, the processing device may resolve the reference by producing a definition of the missing parameter. As explained herein above, the processing device may invoke rules, statistical models, decision trees or other methods that analyze the template or various additional information sources (such as common template libraries or other templates associated with the same customer account) for producing one or more candidate resource definitions. In an illustrative example, the processing device may apply, to the template, a production rule defining an action to be performed on the template responsive to successfully evaluating a condition specified by the rule. In another illustrative example, the processing device may use a statistical model to yield a value of a property of the infrastructure resource. In certain implementations, various parameters of the rules, statistical models, decision trees or other procedures invoked by the processing device may be determined by machine learning methods, as described in more detail herein above.

At block 650, the processing device may modify the template to include the newly created definition of the parameter. As explained herein above, the processing device may select, among multiple candidate resource definitions, the resource definition that has the optimal quality metric value and has been confirmed by the user via the template verification GUI. Alternatively, the processing device may select, among multiple candidate resource definitions, the resource definition that produces a template having the optimal quality metric value and has been confirmed by the user via the template verification GUI.

At block 660, the processing device may cause the cloud infrastructure stack to be provisioned based on the template, and the method may terminate.

Figure 7:
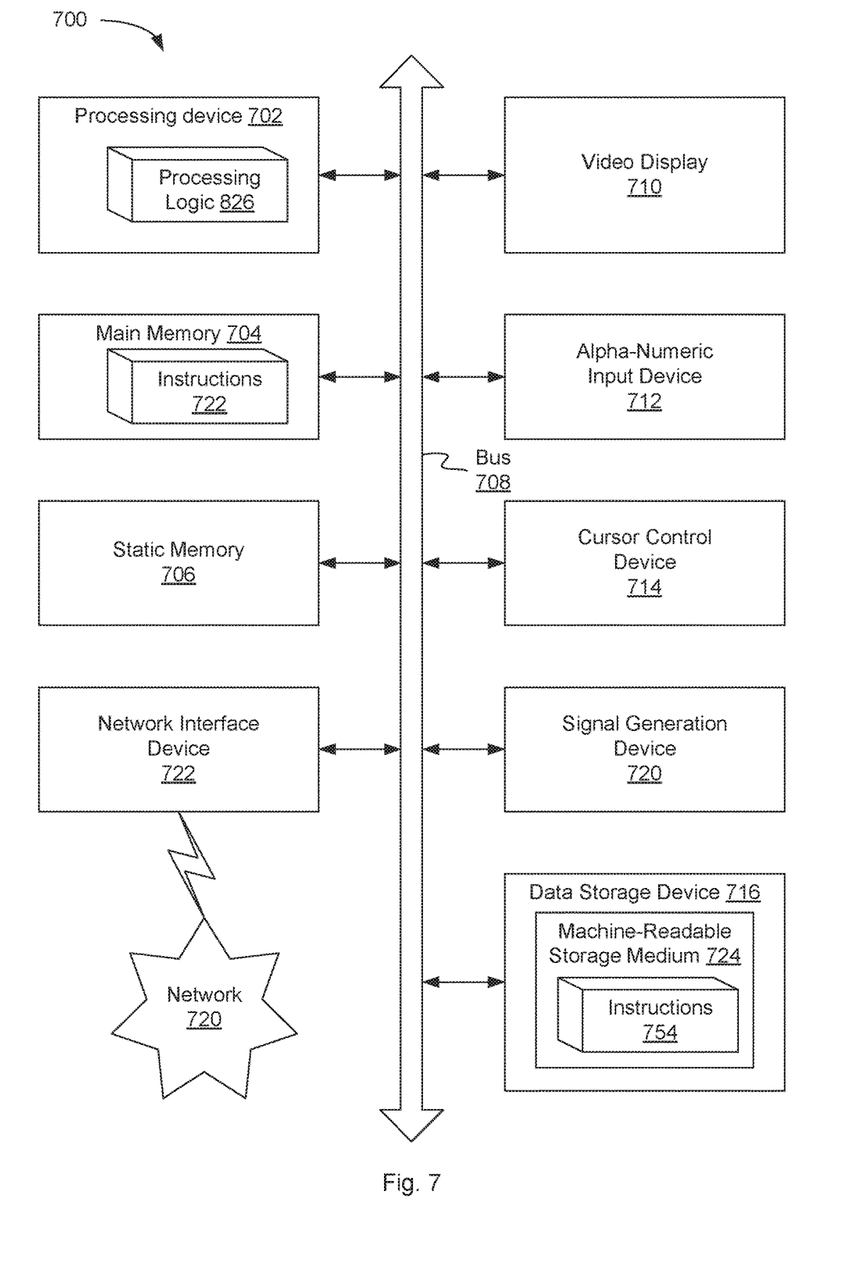
FIG. 7 illustrates a diagrammatic representation of a machine in the exemplary form of a computer system within which a set of instructions, for causing the machine to perform any one or more of the methods discussed herein, may be executed.

FIG. 7 is a block diagram of an example computing device 700, which may perform operations in accordance with one or more aspects of the present disclosure. A set of instructions for causing the computing device 700 to perform any one or more of the methods discussed herein may be executed by the computing device 700. In an illustrative example, the computing device 700 may implement the functions of the cloud management service 140 of FIG. 1.

In various implementations, the computing device 700 may be connected to other computing devices by a network provided by a Local Area Network (LAN), an intranet, an extranet, the Internet or any combination thereof. The computing device may operate in the capacity of a server or a client machine in a client-server network environment or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while only a single machine is illustrated, the term "computing device" shall also be taken to include any collection of machines (e.g., computers) that individually or jointly execute a set (or multiple sets) of instructions to perform any one or more of the methodologies discussed herein.

The computing device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.) and a data storage device 716, which communicate with each other via a bus 708.

The processing device 702 represents one or more general-purpose processors such as a microprocessor, central processing unit or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 702 may therefore include multiple processors. The processing device 702 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor or the like.

The computing device 700 may further include one or more network interface devices 722. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker).

The data storage device 716 may include a computer-readable storage medium 724 on which is stored one or more sets of instructions 754 embodying any one or more of the methods or functions described herein. The instructions 754 may also reside, completely or at least partially, within the main memory 704 and/or within the processing device 702 during execution thereof by the computing device 700; the main memory 704 and the processing device 702 also constituting machine-readable storage media.

While the computer-readable storage medium 724 is shown in an exemplary implementation to be a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

The preceding description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that certain implementations of the systems and methods described herein may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the present disclosure also relate to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

It is to be understood that the above description is intended to be illustrative and not restrictive. Many other implementations will be apparent to those of skill in the art upon reading and understanding the above description. The scope of the present disclosure should, therefore, be determined with reference to the appended claims, along with the full scope of equivalents to which such claims are entitled.

What is claimed is:

1. A method, comprising:
   receiving, by a processing device, a template defining a cloud infrastructure stack associated with a customer account, wherein the template comprises a resource definition of a first cloud infrastructure resource;
   performing a dependency check of the template;
   identifying, in the resource definition, an unresolved reference to a second cloud infrastructure resource;
   producing a definition of the second cloud infrastructure resource by applying, to the template, a rule defining an action to be performed on the template responsive to successfully evaluating a condition specified by the rule;
   modifying the template to include the definition of the second cloud infrastructure resource; and
   causing the cloud infrastructure stack to be provisioned based on the template.

2. The method of claim 1, wherein producing the definition of the second cloud infrastructure resource comprises:
   analyzing a library of template patterns associated with a specified industry domain.

3. The method of claim 1, wherein producing the definition of the second cloud infrastructure resource comprises:
   using a statistical model to yield a value of a property of the second infrastructure resource, wherein the statistical model is produced by a machine learning method.

4. The method of claim 1, wherein producing the definition of the second cloud infrastructure resource comprises:
   receiving, via a user interface, a confirmation of the definition of the second cloud infrastructure resource.

5. The method of claim 1, wherein resolving the reference comprises:
   producing a plurality of candidate definitions of the second cloud infrastructure resource;
   associating a value of a quality metric with each candidate definition of the plurality of candidate definitions; and
   selecting, as the definition of the second cloud infrastructure resource, a candidate definition associated with an optimal value of the quality metric.

6. A computer system, comprising:
   a memory; and
   a processing device coupled to the memory, the processing device to:
   receive a template defining a cloud infrastructure;
   identify, in the template, a resource of the cloud infrastructure, wherein a property of the resource is not defined by the template;
   produce a definition of the property of the resource;
   modify the template using the definition of the property of the resource; and
   cause the cloud infrastructure to be provisioned based on the template.

7. The system of claim 6, wherein the template comprises a text in a formal language.

8. The system of claim 6, wherein to produce the definition of the property of the resource, the processing device is further to:
   analyze a plurality of templates of a customer account associated with the cloud infrastructure.

9. The system of claim 6, wherein to produce the definition of the property of the resource, the processing device is further to:
   analyze a library of template patterns associated with a specified industry domain.

10. The system of claim 6, wherein to produce the definition of the property of the resource, the processing device is further to:
    apply, to the template, a rule defining an action to be performed on the template responsive to successfully evaluating a condition specified by the production rule.

11. The system of claim 6, wherein to produce the definition of the property of the resource, the processing device is further to:
    use a statistical model to define the property of the resource, wherein the statistical model is produced by a machine learning method.

12. The system of claim 6, wherein to produce the definition of the property of the resource, the processing device is further to:
    produce a plurality of candidate definitions of the property of the resource;
    associate a value of a quality metric with each candidate definition of the plurality of candidate definitions; and
    select, as the definition of the template parameter, a candidate definition associated with an optimal value of the quality metric.

13. A non-transitory computer-readable storage medium comprising executable instructions that, when executed by a processing device, cause the processing device to:
    receiving, by a processing device, a template defining a cloud infrastructure;
    identifying, in the template, an unresolved reference to a template parameter;
    resolving the reference by producing a definition of the template parameter;
    modifying the template to include the definition of the template parameter; and
    causing the cloud infrastructure stack to be provisioned based on the template.

14. The non-transitory computer-readable storage medium of claim 13, wherein the template comprises a text in a formal language.

15. The non-transitory computer-readable storage medium of claim 13, further comprising executable instructions to cause the processing device to:
    analyze a plurality of templates of a customer account associated with the cloud infrastructure.

16. The non-transitory computer-readable storage medium of claim 13, further comprising executable instructions to cause the processing device to:

analyze a library of template patterns associated with a specified industry domain.

17. The non-transitory computer-readable storage medium of claim 13, further comprising executable instructions to cause the processing device to:
apply, to the template, a rule defining an action to be performed on the template responsive to successfully evaluating a condition specified by the rule.

18. The non-transitory computer-readable storage medium of claim 13, further comprising executable instructions to cause the processing device to:
use a statistical model to yield a value of the template parameter, wherein the statistical model is produced by a machine learning method.

19. The non-transitory computer-readable storage medium of claim 13, further comprising executable instructions to cause the processing device to:
receive, via a user interface, a confirmation of the definition of the template parameter.

* * * * *